United States Patent

[11] 3,569,647

| [72] | Inventor | Jozef Kiwalle<br>Peoria, Ill. |
|---|---|---|
| [21] | Appl. No. | 835,414 |
| [22] | Filed | June 23, 1969 |
| [45] | Patented | Mar. 9, 1971 |
| [73] | Assignee | Caterpillar Tractor Co.<br>Peoria, Ill. |

[54] BOURDON TUBE ACTUATED ELECTRICAL SWITCH
3 Claims, 1 Drawing Fig.

[52] U.S. Cl.................................................. 200/81.8,
    73/414
[51] Int. Cl..................................................H01h 35/36
[50] Field of Search.......................................... 200/81.8;
    73/414, 411, 368.6 (Inquired)

[56] References Cited
UNITED STATES PATENTS

| 2,125,016 | 7/1938 | Gruver.......................... | 73/414 |
| 2,557,929 | 6/1951 | Baak............................ | 200/81.8X |
| 2,624,196 | 1/1953 | Aller............................ | 200/81.8X |
| 3,267,734 | 8/1966 | Marks.......................... | 73/414 |
| 3,335,609 | 8/1967 | Nelson......................... | 73/414 |

*Primary Examiner*—Milton O. Hirshfield
*Assistant Examiner*—Mark O. Budd
*Attorney*—Fryer, Tjensvold, Feix, Phillips and Lempio

ABSTRACT: A Bourdon tube connected with a microswitch for closing it upon the event of predetermined pressure in a fluid circuit with which the tube is associated. The tube is contained in a liquid tight housing and immersed in a damping fluid to prevent actuation by momentary pressure variations. The switch is adjustable and disposed outside the housing to permit convenient adjustment and add to its useful life by isolating it from the damping fluid.

PATENTED MAR 9 1971
3,569,647
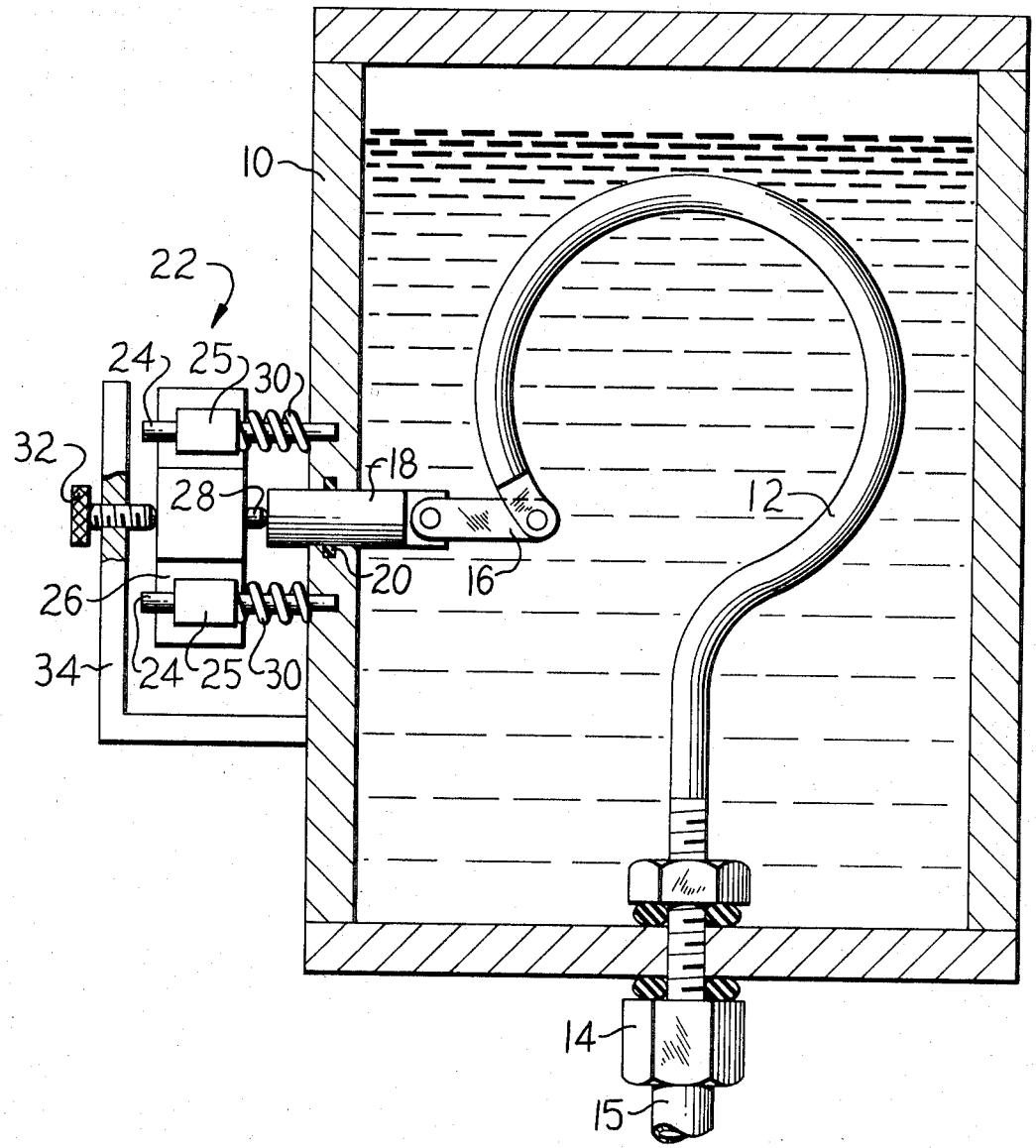
INVENTOR
JOZEF KIWALLE
BY
Fryer, Tjensvold, Feix, Phillips & Lempio
ATTORNEYS

BOURDON TUBE ACTUATED ELECTRICAL SWITCH

Many machine tools and machines employ automatic switches responsive to pressure in a hydraulic circuit for initiating a machine function of one kind or another. Often an element which moves in response to pressure changes, such as a Bourdon tube, is employed to actuate a microswitch which, through suitable electrical, mechanical or hydraulic circuits initiates some desired machine function.

Since machine vibration and other causes often result in momentary pressure rises, it is desirable to employ damping means to prevent actuation of the switch except upon the occasion of more enduring pressure rises.

The present invention provides such damping means of very simple and dependable construction and also provides a switch remote from the damping means and capable of adjustment from outside of the vessel which contains the Bourdon tube and damping means.

The invention will be best understood from the following detailed description wherein reference is made to the accompanying drawing.

The drawing is a sectional view taken through a vessel containing a Bourdon tube and a viscous damping medium and showing a switch disposed exteriorly at the vessel and actuated by the tube therein.

A fluid tight vessel is represented at 10 as containing a Bourdon tube 12 one end of which extends through the bottom wall of the vessel being suitably sealed, as shown, against loss of damping fluid from within the vessel. The extending end of the tube is secured as by a nut 14 to an end of a conduit 15 which communicates with a fluid system in which rise of pressure should initiate a machine function as by closing an electrical switch or the like. The closed end of the Bourdon tube is connected as by a link 16 with a plunger 18 which extends through a wall of the vessel and has a sliding fit therein sealed as by a suitable gasket 20. A rise in pressure of the fluid within the Bourdon tube moves the plunger outwardly and the outward movement actuates a microswitch generally indicated at 22. The microswitch is slidably mounted on parallel supporting pins 24, which extend outwardly from the vessel 10 and through bearings 25 carried on the body 26 of the switch. The switch is energized upon depression of a plunger shown at 28 positioned for contact with the outer end of the member 18. Springs 30 surrounding the members 24, and disposed between the vessel 10 and bearings 25, urge the body of the switch outwardly. A thumb screw 32, threadably supported in a bracket 34, may be turned to urge the switch housing inwardly against the force of the springs 30. Consequently, the position of the switch is capable of adjustment by simply turning the thumb screw 32 in one direction or the other and the position of the actuating plunger 28 with respect to the vessel 10 may be varied so that more or less expansion of the Bourdon tube is required to effect closing of the switch. In this manner, the function of the machine which is controlled by the switch can be accurately timed to occur upon the existence of pressure of a precise value within the Bourdon tube.

The fluid within the vessel 10 may be of any prescribed viscosity, silicone often being employed for this purpose, and will prevent or damp vibration of the tube such as might occur due to physical shock or sudden momentary changes in pressure of the fluid within the tube. Since the motion which actuates the switch is transmitted through the wall of the vessel 10, the switch is not contaminated by the fluid and is readily available for precise adjustment through simple mechanism.

I claim:

1. A bourdon tube actuated switch comprising a vessel, a Bourdon tube within the vessel, a viscous liquid in the vessel immersing the tube, a switch mounted exteriorly of the vessel, and a connection between the free end of the tube and the switch extending through the vessel wall to actuate the switch upon the event of a predetermined pressure within the tube, the connection including a plunger slidably extending through the vessel wall for actuating engagement with the switch, a seal being arranged around the plunger to prevent escape of liquid from the vessel, and a link pivotally interconnected between an end of the plunger within the vessel and the free end of the tube.

2. The invention of claim 1 wherein the switch is mounted for adjustment toward and away from the vessel adjacent an end of the plunger extending through the vessel wall.

3. The invention of claim 2 further comprising adjusting means for urging the switch toward the plunger and spring means for maintaining the switch against the adjusting means.